United States Patent Office 3,157,577
Patented Nov. 17, 1964

3,157,577
ANTISERUM AND PLASMA FOR ALEUTIAN
DISEASE (HYPERGAMMAGLOBULINEMIA) IN
MINK
James D. Russell, Madison, Wis., and Edward C. Muehl-
felt, Cary, Orville Howard Grosse, Palatine, and Alex-
ander J. Ott, Cary, Ill., assignors to American Scien-
tific Laboratories, Inc., a corporation of Wisconsin
No Drawing. Filed May 10, 1962, Ser. No. 193,855
11 Claims. (Cl. 167—78)

This invention relates to the preparation of a pro-
phylactic and therapeutic antiserum or plasma, and the
product thereof. More particularly, this invention re-
lates to the preparation of an antiserum or plasma for
the prophylactic and therapeutic treatment of mink which
is capable of conferring passive immunity to mink against
Aleutian disease, and of the neutralization of the causa-
tive agents of the disease after administration to affected
mink.

Prior to the present invention there existed no spe-
cific, or effective method for therapeutic treatment of
Aleutian disease in mink. The co-pending application
of Russell et al., entitled "Aleutian Disease Vaccine and
Method for Producing Same," describes a prophylactic
vaccine which is effective to prevent the contracting of
Aleutian disease among mink and to arrest the develop-
ment of such disease in an affected animal vaccinated
therewith. The antiserum or plasma of the present in-
vention may be used separately or may be used in com-
bination with the above described vaccine as a thera-
peutic agent.

Accordingly, it is a primary object of the present in-
vention to provide a method for the preparation of anti-
serums and plasma which are capable of conferring
passive immunity to mink against Aleutian disease and
of the neutralization of the causative agents of Aleutian
disease after administration to mink affected therewith.

It is a further object of the present invention to pro-
vide an antiserum or plasma which, when administered
to mink affected with Aleutian disease, will arrest the
progression of such disease and which will effect a regres-
sion of such disease.

It is a still further object of our invention to provide
an antiserum or plasma which may be used alone as a
therapeutic or arresting agent for administration to ani-
mals affected with Aleutian disease, or which may be
used in combination with Aleutian vaccine to provide
both a prophylactic and therapeutic response toward
Aleutian disease in treated mink.

Other objects and advantages will become apparent
from the following detailed description wherein a pre-
ferred embodiment of the present invention has been
selected for exemplification.

In accordance with the present invention, the above
objects may be realized by preparing antiserum or plasma
containing antibodies antagonistic to the agents causing
Aleutian disease in mink from the blood of horses or
other suitable heterologous species, and processing this
antiserum or plasma by various conventional physical
and chemical procedures so as to render the resulting
preparation safe for use. As used in the present applica-
tion, the term "agents causing Aleutian disease in mink"
may include by-products of such agents as well as the
agents themselves.

One preferred general procedure for antiserum produc-
tion is as follows: Normal healthy horses (or other suit-
able species) are hyperimmunized by inoculation with
suspensions of tissue from mink affected with Aleutian
disease. Such suspensions are preferably of the type
described in the above named application of Russell et
al., and may or may not have been treated with physical
or chemical inactivating agents. Several inoculations
of the tissue suspension (or antigen) may be required to
hyperimmunize the donor animal. After a suitable pe-
riod of time for the hyperimmune substances to develop
within the donor animal, whole blood containing Aleu-
tian disease antibodies is withdrawn, and the antiserum
is separated from the cellular components by allowing
the blood to clot and withdrawing the clear antiserum
which is thus formed. Plasma may be prepared by de-
fibrinating or by adding an anti-coagulant to the whole
blood and separating the plasma from the cellular com-
ponents. The serum or plasma containing the Aleutian
disease antibodies may be further treated through filtra-
tion, pasteurization, or by the addition of germicidal
agents or preservative agents known to the art.

The antiserum or plasma may, if desired, be concen-
trated by any of the procedures commonly employed and
known to the art, or the active fraction may be separated
from the other components to further enhance and poten-
tiate its therapeutic value. The finished antiserum or
plasma should contain no living Aleutian disease pro-
ducing agents, and must be sterile in all other respects,
that is, it must not contain living bacteria, yeasts, or
molds.

Normally the antiserum or plasma is administered to
affected mink by subcutaneous injection; however, other
routes such as intraperitoneal, intramuscular, intravenous,
or other recognized methods of administering serum or
serum fractions may be used. The invention may be
used in the therapy as a single therapeutic agent, or may be
used in conjunction with Aleutian disease vaccine in the
treatment of affected animals. This combination treat-
ment generally results in a more rapid and longer lasting
therapeutic response than either product administered
alone. Such a combination treatment may also be ad-
ministered to unaffected animals to provide an immedi-
ate as well as an extended protection against Aleutian
disease.

The present preparation may also be prepared as a
combination antiserum or plasma giving prophylactic
and therapeutic responses to other diseases of mink, such
as mink virus enteritis or distemper, as well as Aleutian
disease. Such a multi-purpose antiserum or plasma may
be produced in the donor animal by suitable hyperim-
munization with various antigens.

The following examples are for the purpose of illus-
tration only, and are not to be considered as limiting the
scope of the present invention in any respect.

EXAMPLE #1

The internal organs (consisting of liver, spleen, and
kidneys) from approximately 250 mink affected with
Aleutian disease were pooled and frozen at −10° centi-
grade. After thawing overnight at 5° centigrade the
organs were ground in an Eppenbach colloid mill as a
20% suspension in sterile distilled water for 20 minutes
with constant recycling. A smooth amorphous tissue
homogenate resulted from this process. The tissue ho-
mogenate was then filtered through graded porosities of
stainless steel screen so that it readily passed through an
80 mesh screen.

The resulting filtered tissue homogenate was divided
into 3 equal portions. The antibiotics crystalline penicil-
lin, 100 I.U./ml., and dihydrostreptomycin, 5 mg./ml.,
were added to one portion. Commercial formalin was
added to the second portion as in the preparation of
Aleutian disease vaccine at 0.6% and incubated for a
week at room temperature. Phenol was added to the
third portion in the amount of 0.5% and this portion
was also incubated for a week at room temperature.

Two horses each were hyperimmunized with the above
prepared proportions by subcutaneous inoculation of the Aleutian disease affected tissue suspensions over a six-week period. Blood was withdrawn aseptically from each horse into sterile ACD anticoagulant vacutainers, and the cells allowed to settle overnight. Clear plasma was poured off and aseptically filled into appropriate sized brown glass bottles. The remaining material was further processed by centrifugation so that additional plasma was obtained. Crystalline penicillin 100 I.U./ml. and dihydrostreptomycin 5.0 mg./ml., were added as preservative agents and 0.2% betapropriolactone was added to the plasma as a germicidal agent. The bottled plasma was checked for the absence of bacterial and mycotic contamination in appropriate media, for general safety by inoculation into mice, and specific safety by inoculation into clean mink free of Aleutian disease.

The plasma from each horse was prepared and bottled and tested separately. All three methods resulted in plasma which did not cause Aleutian disease when inoculated into mink.

EXAMPLE #2

Twenty mink affected with Aleutian disease of varying degrees as determined by the serum iodine agglutination test (IAT) were inoculated intramuscularly with varying amounts of the plasma prepared from the horses which had received the formalin treated tissues. Five additional affected mink were included as untreated controls. All of these mink had been vaccinated two weeks previously with Aleutian disease vaccine. The experimental design and results are given in Table I.

We claim:

1. In a process for producing an antiserum for use in the treatment of mink, the steps of:
   (a) homogenizing a suspension of finely divided tissue obtained from animals affected with Aleutian disease in a liquid suspension medium,
   (b) inoculating a donor animal with said homogenized suspension to produce a condition of hyperimmunization in said animal,
   (c) withdrawing a quantity of blood from said hyperimmunized donor animal,
   (d) separating the antiserum from the cellular product in said blood.

2. In the process of claim 1 the additional step of filtering said tissue suspension prior to inoculation to remove excessively large tissue particles therefrom.

3. In the process of claim 1, separating the antiserum from the cellular products in said blood by allowing the blood to clot and withdrawing the clear antiserum which is thus formed.

4. In a process for producing an antiserum for use in the treatment of mink, the steps of:
   (a) inoculating a donor animal with an Aleutian disease vaccine to produce a condition of hyperimmunization in said animal,
   (b) withdrawnig a quantity of blood from said hyperimmunized donor animal,
   (c) separating the antiserum from the cellular products in said blood.

*Table I*

THE EFFECT OF EQUINE ANTI-ALEUTIAN DISEASE PLASMA ON AFFECTED MINK

| Severity of Disease Prior to Treatment (based on IAT) | Treatment in mls. of Plasma Given Intramuscular | Severity of Disease 10 Days Following Treatment Evaluated on the Basis of— | | | Number Showing Clinical Response Over Number per group |
|---|---|---|---|---|---|
| | | IAT Reaction | Gammaglobulin Paper Electrophoresis | Histopathology [1] | |
| + | 2 | ++ | 24.0 | 1 | |
| + | 2 | | 17.4 | 1 | |
| + | 2 | | 22.2 Av. 19.5% Gammaglobulin | 2 | 5/5 |
| + | 3 | | 17.4 | 1 | |
| + | 3 | | 16.4 | 1 | |
| ++ | 3 | | 22.1 | 1 | |
| ++ | 3 | | 25.0 | 1 | |
| ++ | 3 | + | 22.7 Av. 24.0% Gammaglobulin | 1 | 5/5 |
| ++ | 3 | + | 28.3 | 2 | |
| ++ | 3 | | 21.9 | 2 | |
| +++ | 3 | ++ | | 2 | |
| +++ | 3 | ++ | | 2 | |
| +++ | 3 | + | Not Done | 2 | 5/5 |
| +++ | 3 | ++ | | 2 | |
| +++ | 3 | + | | 1 | |
| +++ | 4 | ++ | | 2 | |
| +++ | 4 | ++ | | 2 | |
| +++ | 4 | +++ | Not Done | 2 | 5/5 |
| +++ | 4 | +++ | | 2 | |
| +++ | 4 | +++ | | 2 | |
| + | No Treatment Control | ++ | 24.2 | 3 | |
| + | | +++ | 37.3 | 3 | |
| + | | | 20.0 Av. 25.6% Gammaglobulin | 3 | 0/5 |
| + | | + | 21.9 | 3 | |
| + | | ++ | 24.8 | 3 | |

[1] Histopathology given as a rating of 1 to 3 whereas:
 1=Complete absence of inflammatory and plasma cells, fibroblastic infiltration, absence of albuminous deposits in proximal kidney tubules.
 2=Resolution taking place; few areas of plasma and inflammatory cells, less scar formation and few albuminous deposits.
 3=Typical picture of progressing Aleutian disease, e.g. chronic interstitial nephritis with cellular infiltration and deposits.

These results indicate that there was a dramatic response to plasma therapy within 10 days following treatment as determined by the serum iodine agglutination reaction and gross and microscopic examination of the tissues (internal organs) from these mink. In all cases, there was histopathological evidence of resolution of the characteristic lesions of Aleutian disease in the treated mink, whereas there was no such improvement in the vaccinated, but untreated with plasma, control mink.

It is understood that the present invention is not limited to the particular embodiments and methods herein described, but embraces all such modified forms thereof as may come within the scope of the following claims.

5. In a process for producing a plasma for use in the treatment of mink, the steps of:
   (a) homogenizing a suspension of finely divided tissue obtained from animals affected with Aleutian disease in a liquid suspension medium,
   (b) inoculating a donor animal with said homogenized suspension to produce a condition of hyperimmunization in said animal,
   (c) withdrawing a quantity of blood from said hyperimmunized donor animal,
   (d) separating the plasma from the cellular product in said blood.

6. In the process in claim 5 the additional step of filtering said tissue suspension prior to inoculation to remove excessively large tissue particles therefrom.

7. In the process of claim 5, separating the plasma from the cellular products in said blood by adding an anticoagulant thereto and drawing the clear plasma therefrom.

8. In the process of claim 5, separating the plasma from the cellular products in said whole blood by defibrinating the whole blood and drawing the clear plasma therefrom.

9. In a process for producing a plasma for use in the treatment of mink, the steps of:
   (a) inoculating a donor animal with an Aleutian disease vaccine to produce a condition of hyperimmunization in said animal,
   (b) withdrawing a quantity of blood from said hyperimmunized animal,
   (c) separating the plasma from the cellular products in said blood.

10. An antiserum for use in the treatment of mink containing Aleutian disease antibodies antagonistic to the agents which cause Aleutian disease in mink, produced by the process of claim 4.

11. A plasma for use in the treatment of mink containing Aleutian disease antibodies antagonistic to the agents which cause Aleutian disease in mink, produced by the process of claim 9.

References Cited in the file of this patent

Henson et al.: "Hypergammaglobulinemia in Mink," P.S.E.B.M., 107 (4), pp. 919–920 (1961).